United States Patent [19]

Knop

[11] 4,194,839

[45] Mar. 25, 1980

[54] CIRCUIT ARRANGEMENT FOR RECOGNIZING AND ADJUSTING COLOR COMPONENTS

[75] Inventor: Hans G. Knop, Heikendorf, Fed. Rep. of Germany

[73] Assignee: Dr. Ing. Rudolf Hell GmbH, Fed. Rep. of Germany

[21] Appl. No.: 807,507

[22] Filed: Jun. 17, 1977

[30] Foreign Application Priority Data

Jun. 23, 1976 [DE] Fed. Rep. of Germany ....... 2628053

[51] Int. Cl.² ............................................... G01J 3/50
[52] U.S. Cl. ................................. 356/407; 356/416; 250/226
[58] Field of Search ................. 364/526; 250/226; 356/173, 178, 186, 195, 407, 416, 425

[56] References Cited

U.S. PATENT DOCUMENTS

| | | | |
|---|---|---|---|
| 3,210,552 | 10/1965 | Young | 250/226 |
| 3,737,239 | 6/1973 | Adams et al. | 356/186 X |
| 3,942,154 | 3/1976 | Akami et al. | 250/226 X |

FOREIGN PATENT DOCUMENTS

| | | |
|---|---|---|
| 1512179 | 12/1970 | Fed. Rep. of Germany . |
| 2103311 | 8/1971 | Fed. Rep. of Germany . |
| 1797049 | 9/1974 | Fed. Rep. of Germany . |

*Primary Examiner*—F. L. Evans
*Attorney, Agent, or Firm*—Hill, Van Santen, Steadman, Chiara & Simpson

[57] ABSTRACT

Apparatus including a circuit arrangement for recognizing colors in which a scanning device scans a colored area and obtains color signal values forming the coordinates of the color locations in a color space and wherein the color selection circuit produces an output signal when the color location assigned to a color scanned lies within a color recognition space and the invention consists of utilizing several differential steps for each color channel so as to form differential voltages from the color signal values and from reference signals and wherein the different signal values are combined and superimposed to obtain a resulting signal with the aid of an adjustable compensation voltage.

12 Claims, 18 Drawing Figures

CIRCUIT ARRANGEMENT FOR RECOGNIZING AND ADJUSTING COLOR COMPONENTS

BACKGROUND OF THE INVENTION

1. Field of the Invention

This invention relates in general to scanning arrangements for recognizing colors using a scanning device.

2. Description of the Prior Art

A color selection circuit is described in U.S. Pat. No. 3,210,522 in which the desired breakdown of the color recognition space are electronically separated by threshold value circuits for the three color signal values. The output of the threshold value circuits are supplied to a coincidence circuit which produces an output signal of constant amplitude when a color lies within the selected limits of the color recognition space. However, this output signal merely supplies a yes-no decision about the presence of a color in the color recognition space. It is, however, often desired that the output signal provide information about the spatial distance of a color from the center of mass color within the color recognition space.

Color selection circuits for forming correction signals are known from various reproduction techniques which primarily effect the colored corner of the color space (magenta, cyan, yellow, red, blue and green) and all grey values. However, these correction signals do influence large areas in the surface of the color space.

It is, however, important for the selective color correction of skin values that smaller areas of the color space be controlled.

A circuit for the correction for skin values is disclosed in German Pat. No. 1,797,049. In this system, first differential signals are formed by separating the signals into positive and negative primary partial signals and then second differential signals are formed from two of the primary partial signals such that the second differential signals are split into secondary color correction signals according to their plus or minus signs.

A narrowing of the color correction area with the secondary color correction signal by means of correcting the second color signal with the secondary color correction signal to form a third color correction signal is accomplished for obtaining correct skin values. This third color correction signal is, for example, at the maximum the color "light red" and decreases toward zero when the color attains depending on the alteration direction is saturated red, white, magenta and yellow values and all grey values. Thus, this color correction signal for "light red" is still effective in a large area comprising the medium brown shades, light orange and light rose colored mixed values. The large effective range has as a consequence, for example, that the correction signal for a specific light yellowish reddish flesh color tone value lying at the edge of the effective range in the color space is much too small whereas the correction signal for an adjoining color is quite correctly measured. A suitable expansion of the color recognition space would be required for moving these errors which, however, cannot be carried out with the circuit disclosed in German Pat. No. 1,797,049. The color correction area range and the relative signal magnitude distribution in the area space are fixed and are essentially adjusted to the correction of skin or flesh values. A displacement or shifting of the effective range in the color space in order to form a selective correction signal for a random color is not possible so that the circuit cannot be universally utilized. A color selection circuit for obtaining color extraction signals is described in German Auslegeschrift No. 1,512,179.

The color signals produced by scanning a design pattern are supplied amplifiers which have gains which are adjusted such that the output signals of the amplifiers are equal with a freely selected color which is the extraction color. From respectively two output signals differential signals are formed and are connected to one another through a NAND gate. If the selected extraction color is then recognized in the scanned design pattern, the extraction signal will appear at the output of the NAND gate which modulates the luminescence of a writing light for the purpose of recording the color extraction. This circuit also supplies a yes-no statement so that only line extractions but not continuous-tone extractions can be recorded. It is possible indeed, to select a center of mass color, however, means for determining a color recognition space are not provided.

In German Offenlegungschrift No. 2,103,311, an arrangement for reproducing color picture images is disclosed containing a color selection circuit for flesh tones and a corrective network for the production of color correction extraction signals. In this system, comparative voltages of reversed polarity are tapped from a voltage selection circuit and then added to the color signals in the color selection circuit and the comparative voltages are measured such that the three resulting primary differential signals are only then equal with one another if a color signal triple is received at the input of the color selection circuit and the color signal triple corresponds with the flesh tone to be identified. The primary differential signals are simultaneously conveyed to a maximum and a minimum selection circuit through a suitable connection and the selection circuit has an output connected with a differential step device in order to form a secondary differential signal from the largest and smallest primary differential signals. The output signal of the color selection circuit mentioned above is formed by means of superimposition of the secondary differential signal with an adjustable compensation voltage and subsequently reaches the correction network in order to form correction signals.

SUMMARY OF THE INVENTION

The present invention relates to a circuit arrangement for the recognition of colors having a scanning device which scans a colored area and obtains color signal values which form the coordinates of the color locations in the color space and has a color selection circuit which supplies an output signal when the color location assigned to a color scanned lies within a color recognition space. The circuit consists of differential means which are assigned to each color channel in order to form differential voltages from the color signal values and from reference signals whose value triples characterize the color to be selected from a connection step for the three differential voltages so as to form a resulting signal and from a superimposition step of the resulting signal with an adjustable compensating voltage to provide the output signal.

Specifically, the invention is to be utilized in a color scanner for the production of color separations for paper or textile printing processes and will be described in this environment.

In a color scanner, the colored image or design pattern which is mounted on a rotating scanning drum is illuminated by a scanning light spot point by point or line by line. Depending upon whether a opaque pattern or a transparent pattern is to be produced the light is reflected or passed through the pattern such that it reaches a scanning device moved parallel to the scanning drum and is there divided into three partial beams of different colors and these beams are respectively supplied to different color channels. Color filters for the spectroscopic color separation of the light received and opto-electrical transducers for obtaining three primary color measuring value signals are assigned to the color channels and said color measuring value signals represent the color densities of the three color values of the image points scanned after a logarithmation is performed.

In the event the color scanner is employed for the production of color extractions for paper print, the logarithmed color measuring value signals are supplied to a color correction circuit which produces as its output three color extraction signals computed according to the mathematical interrelationship of subtractive color mixing so as to record the color extractions "magenta", "cyan" and "yellow". These color extraction signals are amplified and conveyed to writing lights which have their output light beams modulated by the color extraction signals supplied thereto. Recording films are mounted on a rotating recording drum and the films are exposed point by point and line by line by means of the writing lights which are moved axially along the recording drum.

These exposed and developed films are the color extractions desired for the production of the printing forms of a color set. The color correction takes into consideration the color-metrically insufficient quality of the printing colors used in the later to be formed printing process on one hand and allows on the other hand, altering the editorially desired color statement of the reproduction relative to the original. Correction signals are computed from the color measuring value signals for the color correction in the color correction circuit and are superimposed on the color signals such that the effects of the correction signals can be adjusted by corresponding regulating devices.

Generally, a basic correction, and if necessary, an additional selective correction is accomplished to remove residual errors of the basic correction by means of influencing very specific colors or color values or in order to comply with the wishes of a specific client as far as color structure.

It is an object to respectively select the color from the multitude of color combinations or from the color measuring value triples obtained during the scanning with the aid of color selection circuits the particular color which is to be altered and to let the color correction signal effect only that color. Those selective colors as, for example, the extraction colors "magenta", "cyan" and "yellow" the complementary colors "red", "green" and "blue", the color shades "light red" and "dark brown" for the correction of skin shades.

As distinguished from printing on paper, each color is applied to the print carrier separately in textile printing so that each of the colors occurring in the design pattern requires that a color extraction has to be produced from the colored design pattern with the aid of a color scanner and a color selection circuit.

In a design pattern with color areas without gradations in tone arranged separately next to one another, the task is to provide a separation of each individual color from the remaining colors. The corresponding color extraction also called line extractions differentiate only between two density values and supply information about the local distribution of a specific color in the design pattern.

In the case of a design pattern with color areas with gradations in tone also arranged separately next to each other or color areas with gradations in tone including small patches of colors without gradations continuous-tone color extractions are produced which supply not only information about the local color distribution but also about the amount of color.

Color extractions are produced from design patterns with a multiplicity of colors with gradations in tone randomly merged into one another. The fusion of several colors of the design pattern to one color extraction is often desired.

A color selection circuit is also required in a scanning apparatus for pattern designs in order to obtain control data for textile processing machines. In these machines the objective is to first select individual colors from a colored pattern design. These colors are then transposed into control data and are stored as color information in a data memory.

Color selection circuits are also utilized in color control apparatus for printing machines. These control apparatus selectively measure the strength of the coloration on the running print carrier, or they produce control signals from the measured data.

Each color is characterized by three color signal values respectively determining the coordinates of a color location in the three dimensional color space. The objective in the color recognition is not generally to select a very specific color or a specific color location in the color space but rather to determine whether a color location lies within a prescribed color recognition space.

The spatial identification of a color is necessary on one hand, in order to have the ability to take into consideration color tolerances of colors commercially obtainable and of fluctuations of the color distribution in the color areas scanned and it is desirable on the other hand if it is desired to recognize different shades of color.

There is a requirement to spatially delimit a color narrower and narrower and to create specially formed color recognition spaces within the color space. This is necessary for example, in order to delimit the effective range of a color correction signal relative to a specific color or to a specific color hue intensity or brightness.

If is an object of a color selection circuit to electrically evaluate the many color signal combinations obtained with the scanning of a color area, and to examine whether a color signal triple falls within the limits of a color recognition space and if necessary, to indicate the presence of a color within such limits. The output signal of a color selection circuit can then as the sample embodiments of the invention illustrate, be processed as color correction signals as color extraction signals are as measured process variable signals.

As previously mentioned, the color selection circuit is characterized by the position of the center of mass color and by the form expansion and orientation of the color recognition space in the color space. The output signal of the color selection circuit is thereby maximum for the center of mass color and is zero for color locations at the borders or edges of the color recognition space.

The color locations of a maximum output voltage in the known color selection circuit lie on a parallel line or if necessary, at an angle to the grey axis of the color space on a straight line where this straight line goes through the color location of the center of mass color adjusted with the aid of the voltage selection circuit. The color recognition space forms a stretched prismatic body running axis symmetrical to the straight line and the body is not aligned with the coordinate axes.

The position of the color recognition space indeed can be aligned in the color space by means of alteration of the center of mass color in such a manner that the longitudinal axis falls in a color tone or shade plane so that the color shades (chroma-intensity) can be recognized, however, the selection of a single center of mass randomly selected in the color space for which the output signal has a maximum value is not possible.

The form in position of the color recognition space can be altered in prior art systems, however, an orientation in relation to the coordinate axes of the color space and a form alteration separately of all three coordinate directions cannot be accomplished. It is not possible, for example, to align the color recognition space point-symmetrically relative to the center of mass color.

For a general description of color theory, reference may be made to Television Engineering Handbook by Fink, McGraw-Hill, 1957, pages 4-2 through 4-45.

The present invention has the objective of removing the disadvantages of the prior art systems and incorporates a color selection circuit in which a center of mass color is randomly and precisely selectable in the color space and the form of the color recognition space can be adjusted exactly and can be adjusted separately in all coordinate directions of the color space so that the output signal of the color selection circuit is effective in very narrow and precisely defined color areas.

This task is solved with the invention by using two adjustable amplitude distortion stages for each color channel which influence the amplitudes of the positive and negative differential signals and magnitude stages for the differential signal are connected at the input and a step where signals are added is utilized in which the g mounts of the differential voltages from each color channel are combined to obtain the resulting signal in a selectable magnitude.

A further advantage of the invention consists that the compensation voltage can be derived from a color signal.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figures 1, 1A, 1B:
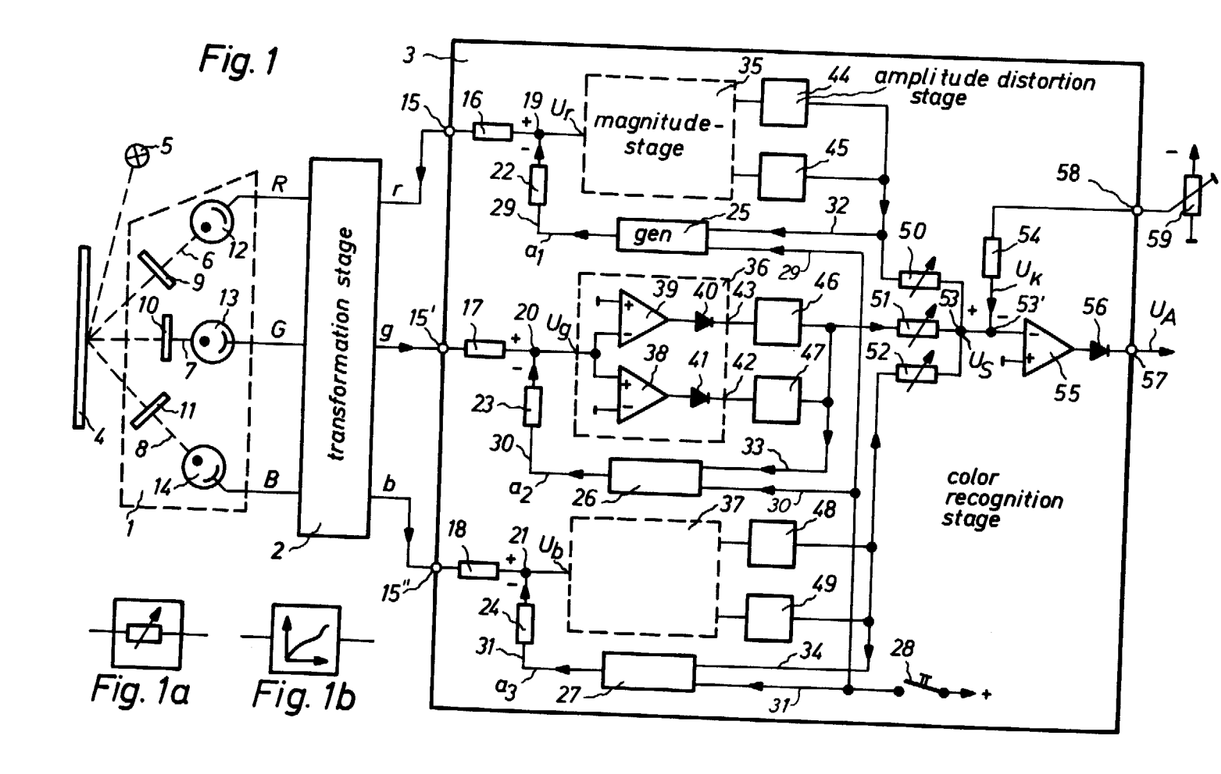
FIG. 1 is a block diagram of the invention.
FIGS. 1a and 1b illustrate amplitude distortion stages.
Figure 7:
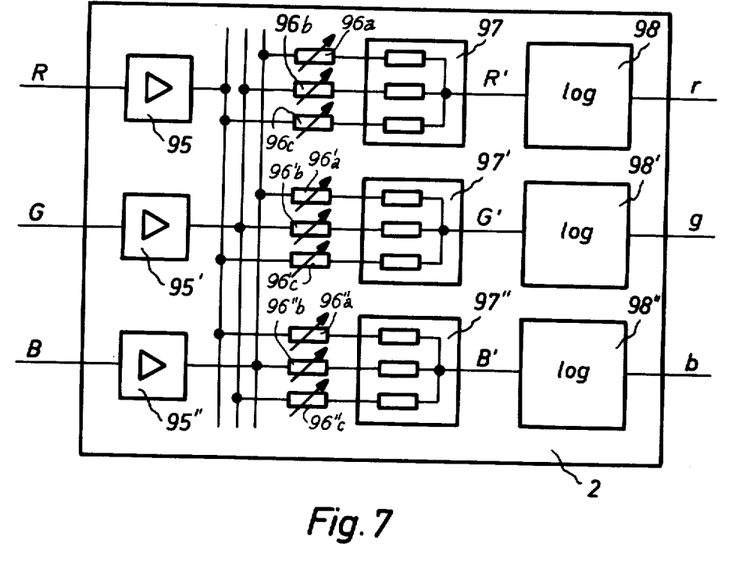
FIG. 7 is a detail diagram of the transformation stage shown in FIG. 1.

FIG. 1 schematically illustrates the invention for obtaining primary color of measuring signal values by means of a scanning device 1 which receives color information from a color pattern 4 illuminated by means of a white light source 5. The light is reflected by the pattern 4 and is split up by means of semi-permeable mirrors into three partial beams 6, 7 and 8 and are passed through color filters 9, 10 and 11 which pass primary colors such as red, R, green, G and blue, B. The signals 6, 7 and 8 after passing through the filters 9, 10 and 11 are received by transducers 12, 13 and 14 which produce electrical signals proportional to the red, green and blue components, respectively. A transformation stage 2 receives the outputs of the transducers 12, 13 and 14 and transforms them into color signals r, g, b. The detail circuitry of the transformation stage 2 is illustrated in FIG. 7. The output signal r is supplied to an input terminal 15 of a color recognition stage 3. The signal "g" is supplied to an input terminal 15' of the color recognition stage and the signal "b" is supplied to an input terminal 15" of the color recognition stage.

The signals supplied to terminals 15, 15' and 15" of the color recognition stage 3 have been amplified and a logarithmation or partial logrithmation of the color measuring values has been accomplished in the transformation stage 2. However, mixing of pairs of the colored measured value signals can also be accomplished in the transformation stage 2 and the mixing corresponds with a transformation in the color space into the luminescence -saturation-chromaticity-coordinate system.

The color signals, if assumed positive, pass from terminals 15, 15' and 15" through decoupling resistors 16, 17 and 18, respectively to summation points 19, 20 and 21, respectively. The summation point 19 also receives an adjustable comparative voltage $a_1$ of reverse polarity which is supplied through resistor 22 to point 19. Comparative voltage $a_1$ is supplied from generator 25. Comparative voltage $a_2$ is supplied by generator 26 and through resistor 23 to summation point 20. Comparative voltage $a_3$ of reverse polarity is supplied by generator 27 through resistor 24 to summation point 21. Differential signals for each colored channel $U_r$, $U_g$ and $U_b$ appear at summation points 19, 20 and 21 respectively.

These differential signals are compensated for zero for the selected center of mass color with the aid of the comparative voltages.

The scanning device 1 scans the center of mass color on the pattern 4 and the color signal corresponding which are the values $r_o$, $g_o$ and $b_o$ appear at the inputs 15, 15' and 15" of the color selection circuit 3. The comparative voltages $a_1$, $a_2$ and $a_3$ are altered so that the differential signals $U_r$, $U_g$ and $U_b$ in all three color channels are equal to zero. For this case $a_1$ equals $r_o$, $a_2$ equals $g_o$ and $a_3$ equals $b_o$. It is to be realized, of course, that the values $a_1$, $a_2$ and $a_3$ exist at the summing points 19, 20 and 21 after passing the resistors 22, 23 and 24, respectively.

For automatic zero adjustment of the differential signals, the voltage generators 25, 26 and 27 produce the comparative voltages which have an output that increases from zero during the time that a key 28 is closed to supply voltages to lines 29, 30 and 31 at the input of the generators 25, 26 and 27, respectively. After compensation is completed the voltage generators 25, 26 and 27 are stopped by lines 32, 33 and 34 and the instantaneously obtained voltage value is fixed and held at the output of the generators 25, 26 and 27.

The comparative voltages can also be obtained from potentiometers and the zero adjustment can be manually carried out with a voltage meter.

The three adjusted fixed values $a_1$, $a_2$ and $a_3$ which characterize the selected center of mass color are continuously compared with the random color combination signals r, g and b resulting from the actual scanning of the picture during the color selection.

Positive or negative differential signals $\pm U_r$, $\pm U_g$ and $\pm U_b$, are thereby formed and represent a measure for the distance of the color locations of the color scanned in relation to the center of mass color in the direction of the R, G, B coordinates of the color space and which were equal to zero when the center of mass color was identified.

Each differential signal $U_r$, $U_g$, $U_b$ are supplied to magnitude stages 35, 36 and 37 and each of these structures are identical and only the magnitude stage 36 is illustrated in detail in FIG. 1. Magnitude stage 36, for example, includes a non-inverting amplifier 38 and an inverting amplifier 39 for the differential signals with the negative signals going to amplifier 39 and the positive signals going to amplifier 38. Diode 40 is connected to the output of amplifier 39 and diode 41 is connected to the output of amplifier 38 and are polled to pass positive signals to output terminals 43 and 42, respectively. An output will appear at terminal 42 or 43 depending upon whether the input signal $U_g$ was negative or positive with an output appearing at terminal 43 if the input signal was negative and an output signal appearing at terminal 42 if the input signal were positive. It is to be realized, of course, that magnitude stage 35 and 37 have similar structures to that illustrated for magnitude stage 36. Six amplitude distortion stages 44 through 49 are connected to the output of the magnitude stages 35, 36 and 37 with stages 44 and 45 connected to magnitude stage 35, amplitude distortion stages 46 and 47 respectively connected to terminals 43 and 42 of magnitude stage 35 and amplitude distortion stages 48 and 49, respectively connected to the output of magnitude stage 37. Each of the amplitude distortion stages 44 and 45, 46 and 47 and 48 and 49 receive either the positive or negative signal applied to the inputs respectively of stages 35, 36 and 37 as illustrated with regard to magnitude stage 36.

The amplitude distortion stages 44 through 49 can be simple potentiometers such as illustrated in FIGS. 1a for adjusting the amplitude of the output signals from the magnitude stages 35, 36 and 37 or they may also be function generators with outputs such as illustrated in FIG. 1b which produce differential voltages according to a prescribed function.

The outputs of respective two amplitude distortion stages relating to a single color channel are combined and the amount of the differential voltages of all three color channels are added to form a resulting signal $U_S$ at an additional summation point 53. The output of the amplitude distortion stages 44 and 45 is connected through an adjustable resistor 50 to point 53. The output of amplitude distortion stages 46 and 47 is connected through a variable resistor 51 to adding point 53 and the output of amplitude distortion stages 48 and 49 is connected through an adjustable resistor 52 to adding point 53. An adjustable compensation voltage $U_K$ of reversed polarity is superimposed with the resulting signal $U_S$ at summation point 53'. The voltage $U_K$ of reverse polarity is fed from a potentiometer 59 through a resistor 54 to adding point 53'.

Summing point 53' is supplied to the inverting input of an amplifier 55 and the output of the amplifier 55 is supplied through a diode 56 to an output terminal 57 of the color selection circuit 3 and is identified as $U_A$ in FIG. 1. The diode 56 passes only positive signals and, thus, the output signal at terminal 57 will only be a positive signal. The potentiometer 59 supplies an input to resistor 54 through input terminal 58.

Figure 4:
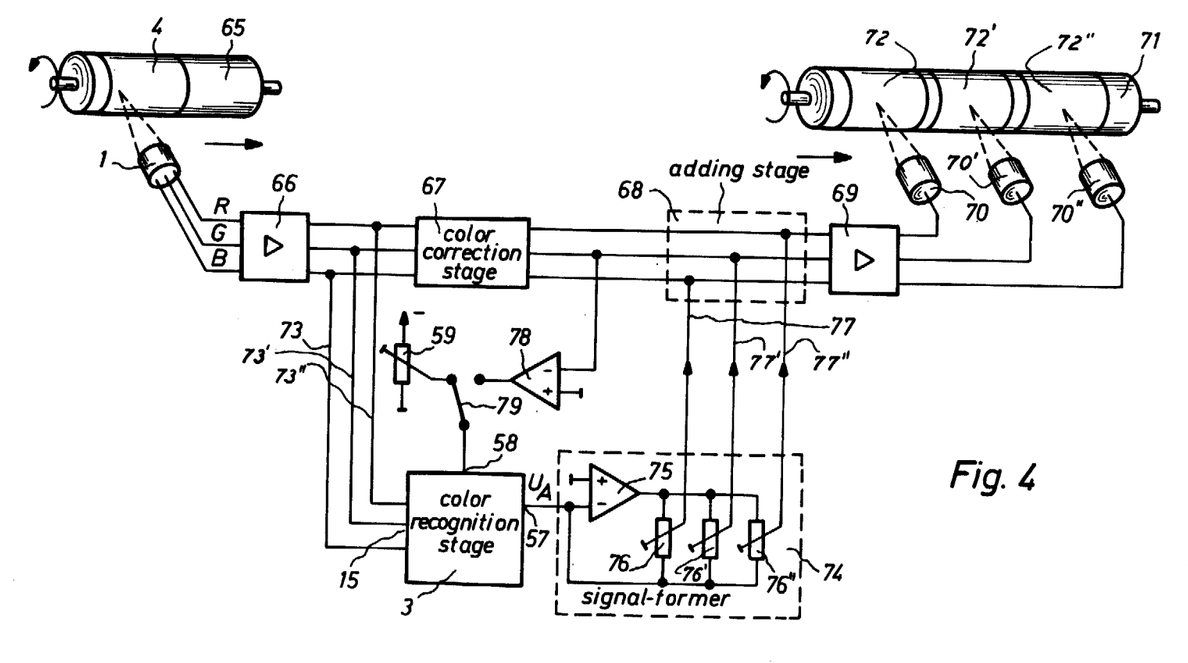
FIG. 4 illustrates an embodiment of the invention utilizing color selection circuit.
Figure 5:
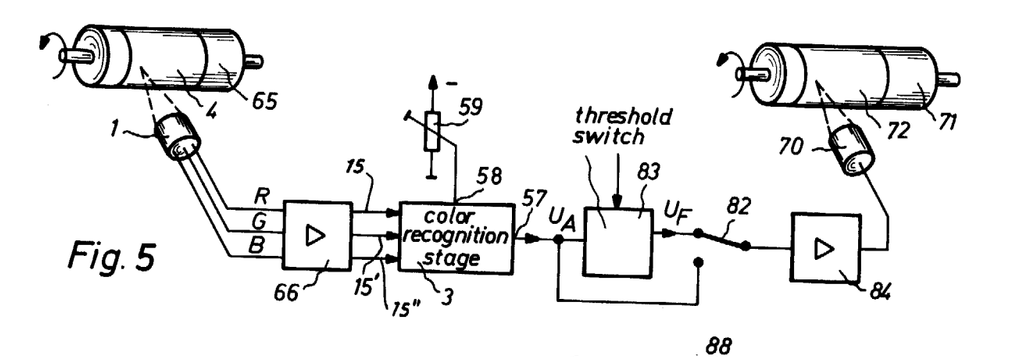
FIG. 5 illustrates a modification of the invention utilizing color selection circuitry.

The output signal $U_A$ of the color selection 3 can be used for forming correcting signals as illustrated in FIG. 4, as color extraction signals as illustrated in FIG. 5 and can also be utilized as control or measuring signals.

FIGS. 2a through 2g are graphic illustrations of the variations in the output signal $U_A$ for different adjustments of the color selection circuit and the connection between the output signal $U_A$, the position of the color location of the center of mass color and the position of the color recognition space in the color space.

The output signal $U_A$ is a function of the distance of a color location from the color location of the center of mass and when the output signal $U_A$ in the center of mass color has a maximum value and obtains the value of zero at the edges or borders of the color recognition space and also retains the value of zero outside of the color recognition space.

Figure 2A:
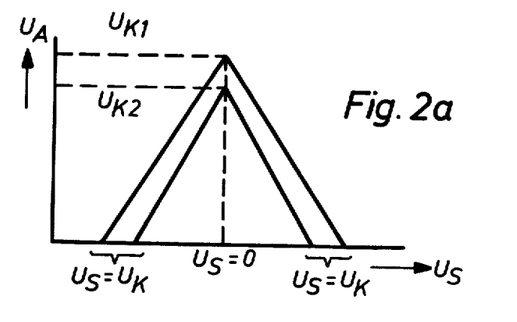
FIGS. 2a through 2g are plots of the output signals of a color selection circuit.

FIG. 2a illustrates the relationship between the output signal $U_A$, the compensation voltage $U_K$ and the resulting signal $U_S$.

As was described relative to FIG. 1, the resulting signal $U_S$ equals zero when the center of mass color is scanned so that the output signal $U_A$ is equal to the compensation voltage $U_K$ which has been set. The amount of the differential voltages of the individual color channels supplied different portions of the resulting signal $U_S$ when any kind of color is scanned. If the resulting signal $U_S$ is equal to the compensation voltage $U_K$ the edges of borders of the color recognition space have been reached. The volume of the color recognition space can be adjusted with the compensation voltage ($U_{K1}$; $U_{K2}$) whereby the color recognition space always lies space-symmetrically to the color location of the center of mass color.

Figures 2B, 2D:
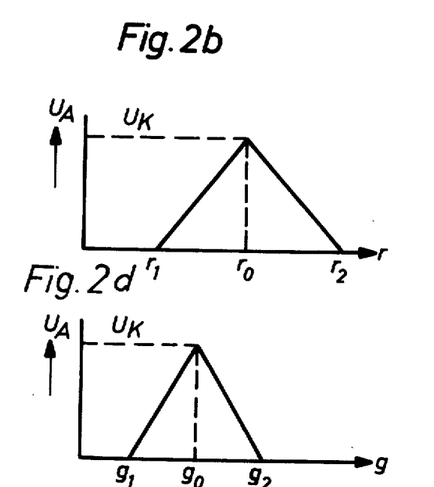

FIG. 2b illustrates the plot of the output signal $U_A$ depending on the values for the signal r which depends on the coordinates of the color space. FIG. 2d illustrates a plot of the signal $U_A$ of the signal "g" and FIG. 2f illustrates a plot of the signal $U_K$ of the signal "b". The amount of the differential voltages in the resulting signal $U_S$ can be separately adjusted for each color channel by using different values of the resistors 50, 51 and 52 of the color section circuit 3 illustrated in FIG. 1 such that a different evaluation of the color channels is possible when forming the output signal $U_A$. The edges or borders of the color recognition space ($r_1$; $r_2/g_1$; $g_2/b_1$; $b_2$) are thereby different in all three coordinate directions. They are, however, axis-symmetrically selected in relation to the color location of the center of mass color ($r_o$; $g_o$; $b_o$).

Figure 2C:
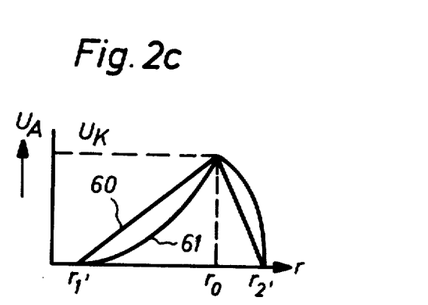
Figure 2E:
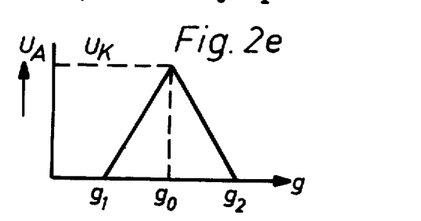
Figure 2F:
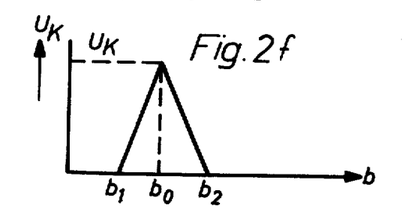
Figure 2G:
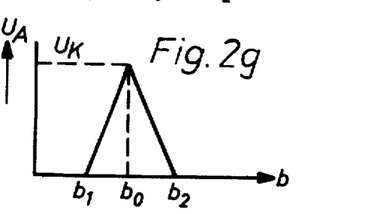
Figure 3:
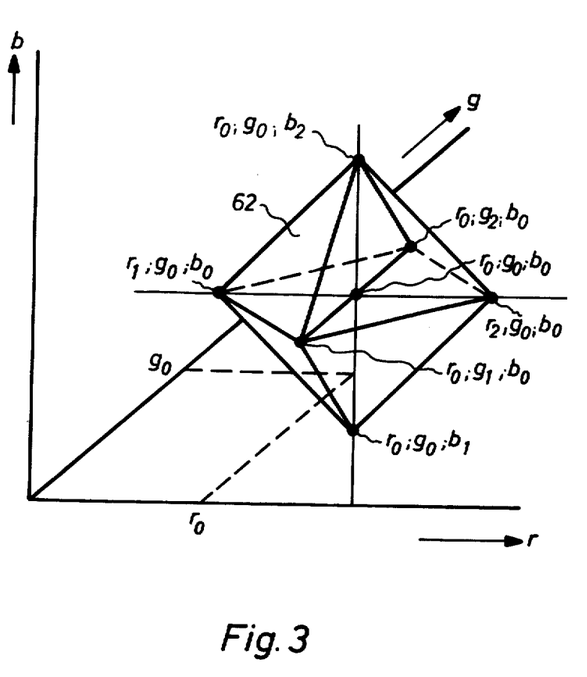
FIG. 3 is a plot of a color recognition space.

FIG. 2c illustrates the effect of the amplitude distortion stages in the color channel with the aid of which a direction dependent and different configuration of the color recognition space can be accomplished in all three coordinates.

Merely the effect in one color channel is illustrated whereas the others remain unchanged. If the amplitude distortion stage, is a potentiometer a linear result of the output signal $U_A$ results between the coordinates $r_o$ and between $r_1'$ or $r_2'$ (line 60). If the amplitude distortion stage, however, is a function generator, then the plot will be a curved line as illustrated by line 61 in FIG. 2c.

FIG. 4 illustrates an embodiment of the invention wherein the inventive color selection circuit 3 is used to form selective color correction signals in color scanners for paper printing.

The colored pattern 4 is mounted on a rotating scanning drum 65 and the pattern can be an image or lettering pattern. The pattern 4 is scanned point by point and line by line by a light spot of a light source not illustrated. In the case of an opaque image pattern the reflected light and in the case of a transparent impage pattern the light passing therethrough reaches the scanning device 1 which is along the scanning drum 65 in parallel fashion and the scanning device produces the three color measuring value signals R, G, B. The color measuring value signals are supplied to an amplifier 66 where they are amplified and the output of the amplifier 66 is supplied to a color correction circuit 67 for the basic correction. A superimposition stage 68 is connected to the output of the color correction stage 67 and additional selective correction signals are superimposed to the basic color corrected signals. The color extraction signals for recording the color extractions "magenta", "cyan" and "yellow" are at the output of the superimposition stage 68. The color extraction signals are supplied to writing lamps 70, 70' and 70" through an amplifier 69. Three films 72, 72' and 72" are mounted on a rotating drum 71 which is driven by a suitable motor and the writing lamp 70, 70' and 70" simultaneously expose the films 72 point by point and line by line. The exposed and developed films comprise the color extractions.

A color recognition space has to be determined for the formation of the selective correction signals and the space corresponds with the effective range desired for the selective correction signals in the color space. The color measuring values signals are applied from the output of amplifier 66 through lines 73, 73' and 73" and the color recognition stage 3 which is described relative to FIGS. 1 and 2 provides the desired color recognition space determination.

The output signal $U_A$ appearing at terminal 57 of the color recognition stage 3 is supplied to a signal former circuit 74 in order to form three selective correction signals and the signal former 74 first inverts the output signal $U_A$ in an inverter 75. Output voltages of both polarities are formed and three potentiometers 76, 76' and 76" are connected across these positive and negative polarities and positive and negative selective correction signals can be obtained from these potentiometers. These selective correction signals are supplied by leads 77, 77' and 77" to the adding stage 68 where there are superimposed on the output of the color correction stage 67 and then supplied to the inputs of amplifier 69.

As the correction signals are derived from the output signal $U_A$ of the color selection circuit 3 they are at a maximum when the center of mass color set is scanned and attain the value of zero at the border or edges of the color recognition space.

It has been found expedient to derive the compensation voltage $U_K$ for the color selection circuit from a color extraction signal in special cases for correction for example of flesh colors. Then the magnitude of the color recognition space is not constant, it rather fluctuates with the color extraction signal. The color extraction signal "magenta" in the sample embodiment is inverted relative to its polarity in an inverter 78 and is supplied to the control input 58 of the color recognition stage 3 through a switch 79.

FIG. 5 illustrates an embodiment for the color selection circuit in color scanners for the production of color extractions for textile printing.

As was mentioned in the introduction of the application, each color is applied on the print carrier in textile prints so that for each color of the design pattern a separate color extraction has to be produced with the aid of the inventive color selection circuit of the invention.

A color design pattern 4 is mounted on a rotating scanning drum 65 and the pattern is scanned point by point and line by line by scanning device 1 so as to obtain the three color measuring value signals R, G, B. The color measuring signals are amplified in the amplifier 66 and supplied to the inputs 15, 15' and 15" of the color selection circuit 3. In the color selection circuit 3 the extraction color to be recorded and the delimiting color recognition space are adjusted as the center of mass color. The output signal $U_A$ of the color recognition circuit 3 is supplied as a color extraction signal to a terminal amplifier 84 either directly or through an adjustable threshold value switch 83 depending upon the position of a switch 82. The terminal amplifier 84 supplies the writing lamp 70 which exposes the film 72 on the recording drum 71. In order to record line extractions, the switch 82 is in the position shown in FIG. 5 and the output signal $U_A$ is transformed in the threshold value switch 83 into a two value color extraction signal $U_F$ corresponding with small or large density values.

Figure 5A:
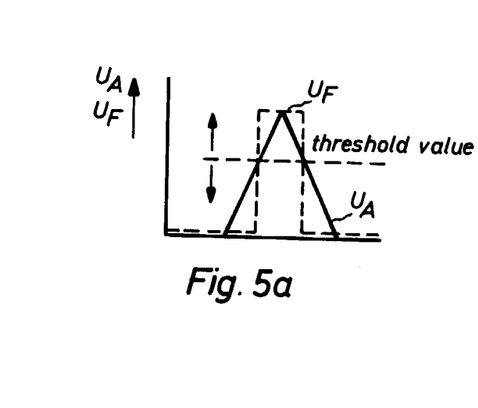
FIG. 5a is a plot of output signal.

By adjusting the threshold value, the area borders of the color recognition space can additionally be displaced and the distance of a color still permitted from the center of mass color can be adjusted. These conditions are illustrated in FIG. 5a.

So as to record continuous extractions, the switch 82 is in the position where it is directly connected to the output of color recognition stage 3 and the output signal $U_A$ of the color selection circuit 3 corresponds to the color extraction signal $U_F$ whereby the signal magnitude is proportional to the density value to be recorded.

Figure 6:
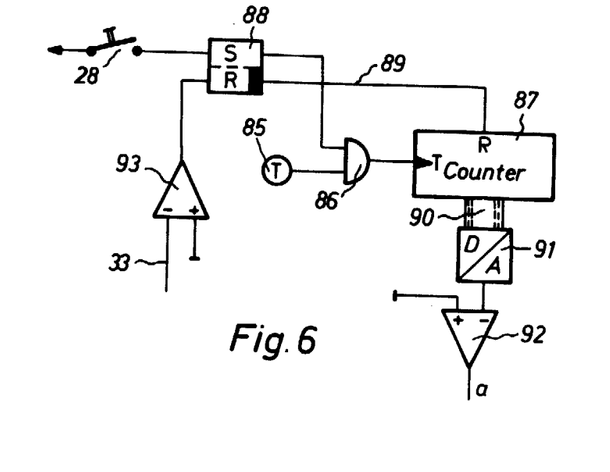
FIG. 6 illustrates a sample embodiment of the voltage generator.

FIG. 6 illustrates a sample embodiment for a voltage generator. A pulse generator 85 is connected to the T input of a binary counter 87 through an AND gate 86.

By closing switch key 28, a RS flip-flop 88 is set. The Q-output of the RS flip-flop 88 goes into the H area and the AND gate 86 is prepared. By means of an L signal at the $\overline{Q}$ output of the RS flipflop 88, the binary counter 87 is reset by way of line 89.

The count pulse sequence of the pulse generator 85 is counted into the binary counter 87 and its counted position is continuously increased after starting from zero. The data outputs 90 of the binary counter 87 are connected to a digital to analog transducer 91 which supplies an analog voltage that increases proportional to the counter position. A sign reversal is accomplished with an inverter 92 connected at the output of the digital to analog converter 91 so that a negative comparative voltage provides the output of the voltage generator.

A comparator 93 is provided as zero indication and produces TTL-levels at its output and the output attains the L area when a voltage is present on line 33 and gives off a H signal when the voltage value on line 33 is zero. The H signal resets the RS flip-flop 88 so that the counting process is interrupted and the comparative voltage instantaneously is fixed and held at such value.

FIG. 7 is a block diagram of the transformation stage 2 illustrated in FIG. 1. The three color measuring value signals R, G, B are respectively supplied to amplifiers 95, 95′ and 95″ as shown and are then supplied to adding stages 97, 97′ and 97″ through potentiometers 96a, 96b, 96c as well as 96′a, 96′b, 96′c and 96″a, 96″b and 96″c. The output signals of the adding stages 97, 97′ and 97″ are identified as R′, G′ and B′ and are supplied to logrithmation stages 98, 98′ and 98″ respectively, which provide the output signals r, g and b connected to the input of the color recognition circuit 3 as illustrated in FIG. 1. Sample embodiments of the logrithmation stages 98, 98′ and 98″ are described in great detail in U.S. Pat. No. 3,590,142, FIG. 4 and U.S. Pat. No. 3,629,490 FIG. 3.

The voltage generators 25, 26 and 27 of FIG. 1 are illustrated in detail in FIG. 6.

The magnitude stages 35 and 37 are of the same form as the magnitude stae 36 illustrated in detail in FIG. 1.

The amplitude distortion stages 44 through 49 would be potentiometers as illustrated in FIGS. 1a or function generators as illustrated in FIG. 1b so as to vary the input voltages.

Figure 8:
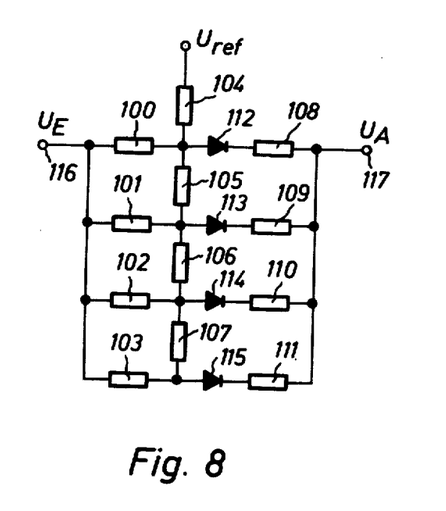
FIG. 8 is an example of a function generator.

A function generator is illustrated in FIG. 8. In such a function generator, the input signal $U_E$ supplied to terminal 116 is modified and reaches the output terminal 117 as signal $U_A$ after passing through the resistors 100, 101, 102, 103, 108, 109, 110, 111, the resistors 104, 105, 106 and 107 connected with the diodes 112 through 115 as shown. A reference signal $U_{ref}$ is connected as shown to resistor 104.

A color computer 67 such as illustrated in FIG. 4 of the application transforms the color measuring value signals R, G, B according to the subtractive color mixing into the corrected color extraction signals "magenta", "cyan" and "yellow".

Such a color computer is extensively explained and illustrated in U.S. Pat. No. 3,885,244, FIG. 4.

FIG. 5 illustrates a threshold switch 83 which transforms the inut signal $U_A$ into a rectangular signal $U_F$ according to the characteristic illustrated in FIG. 5a.

Figure 9:
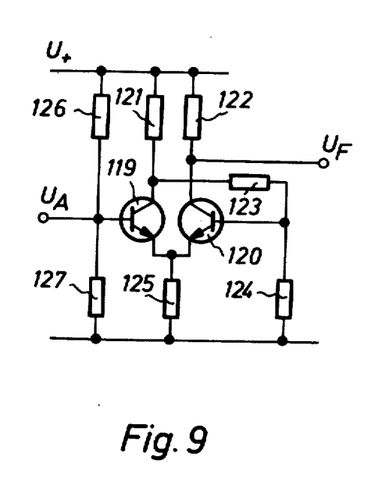
FIG. 9 illustrates the threshold value step generator.

The threshold value stepper 83 utilizes a known Schmidttrigger circuit which is illustrated in greater detail in FIG. 9. Two transistors 119 and 120 receive operating feed voltage U through operating resistors 121, 122 connected to their collector. The transistor 120 is resistive coupled to the transistor 119 through resistors 123 and 124. The resistor 125 is the common emitter resistance for the two transistor. The threshold value for the input voltage $U_A$ are the switching point for the transistors is determined by the voltage divider resistors 126 and 127 connected as shown.

It is seen that this invention provides a novel color recognizing circuit and although it has been described with respect to preferred embodiments it is not to be so limited as changes and modifications may be made therein which are within the full intended of the invention as defined by the appended claims.

I claim as my invention:

1. A color selection circuit arrangement for recognizing colors, particularly a color pattern, with a device scanning the color pattern in order to produce a number of primary signals for each scanning location, including devices for producing a corresponding number of comparative signals adjustable in dependency of a color to be recognized, a corresponding number of subtraction stages for producing differential signals from a plurality of primary color signals and the respectively corresponding comparative signals and respectively receiving inputs from said scanning device and said comparative signal devices, a linkage circuit for the differential signals for producing an output signal characterizing the deviation of the respectively scanned color from the color to be recognized, a compensation stage for subtracting the output signal of the linkage circuit from an adjustable inverted polarity voltage, and with a circuit for suppressing the output signal of the compensation stage when the output signal of the linkage circuit is larger than a counter voltage, comprising;

(a) at each subtraction stage (19, 20, 21) a respective magnitude stage (35, 36, 37) with a first output (42) indicating signals derived from positive output signals of the subtraction stages (19, 20, 21) and with a second output (43) indicating signals derived from negative output signals of the subtraction stages (19, 20, 21), (b) the first and the secnd outputs (42 or 43) of each magnitude stage (35, 36, 37) is respectively connected with an adjustable amplitude distortion stage (44 through 49), and (c) a plurality of variable resistors (50 through 53) are provided for the selectable weighting and combining of the output signals of the amplitude distortion stages (44 through 49) as the output signal.

2. A circuit arrangement according to claim 1, where a counter voltage ($U_k$) is derived from a primary color signal.

3. A circuit arrangement according to claim 2, wherein said color selection circuit is for color correction, so as to derive correction signals selectable according to amplitude using addition and subtraction.

4. A circuit arrangement according to claim 1 wherein the output signal of the color selection circuit is utilized for the production of color extractions and is the color extraction signal.

5. A color selection arrangement for recognizing colors, in particular those of a color pattern, consisting of first means for scanning the pattern to generate a plurality of primary color signals for each point scanned, said signals representing the color components of said point, second means for producing a corresponding plurality of adjustable comparative signals representing the color components of the color to be recognized, third means for generating a corresponding plurality of differential signals from said primary color signals and said corresponding comparative signals, said third means receiving inputs from said first and second means, fourth means connected to said third means for combining the differential signals to obtain an output signal indicating the deviation of the respectively scanned color form the color to be recognized, and further consisting of fifth means connected to said fourth means for subtracting the output signal of the fourth means from an adjustable inverted polarity voltage, and sixth means connected to said fifth means to suppress the output signal whenever it is larger than the inverted polarity voltage, comprising:

(a) seventh means (35; 36; 37) connected to the outputs of said third means (19; 20; 21) for quantifying said differential signals, said seventh means having first outputs (42) for the quantified signals derived from positive differential signals and second outputs (43) for the quantified signals derived from negative differential signals;

(b) adjustable eighth means (44-49) respectively connected to the first and second outputs (42; 43) of the seventh means for varying the amplitude of each quantified signal; and (c) ninth means (50-53) following said eighth means for combining selectable amounts of the varied and quantified signals as said output signal.

6. An arrangement according to claim 5, wherein the adjustable inverted polarity voltage is derived from a primary color signal.

7. An arrangement according to claim 5, wherein the color selection arrangement is used in color correction to derive from said output signal correction signals selectable in accordance with amount and sign.

8. An arrangement according to claim 5, wherein the color selection arrangement is used to produce color separations, with the output signal forming the color separation signal.

9. A color correction circuit including scanning means for scanning a color pattern and deriving three primary color signals, a color transformation stage receiving said three primary color signals and producing three adjusted primary color signals, a color recognition stage receiving said adjusted primary color signals including three generators producing three comparative signals having negative polarities, the adjusted primary color signals and negative signals of the generators combined to form three positive or negative differential signals, and including three quantifying stages each receiving a differential signal, each of said quantifying stages consisting of two converters for separating the differential signal into a positive and negative signal, and a pair of diodes for passing and blocking the positive and negative signals in order to obtain two positive signals representing the positive differential signal, further comprising a plurality of amplitude forming stages with pairs of such stages connected to the diodes, the outputs of said pairs of said amplitude forming stages connected together and connected to said generators and the outputs combined to form a color correction signal.

10. A color correction circuit according to claim 9 wherein a reference signal of negative polarity is combined with said color correction signal to form an adjusted color correction signal.

11. A color correction circuit according to claim 10, including an inverter receiving said adjusted color correction signal to invert it and an additional diode connected to said inverter.

12. A color correction circuit according to claim 11 wherein said reference signal of negative polarity is obtained from a potentiometer.

* * * * *